July 6, 1926.

A. E. NASH ET AL

HEAT TRANSFER SYSTEM

Filed Dec. 24, 1924  2 Sheets-Sheet 1

1,591,431

INVENTORS
James S. Alcorn and
Arthur E. Nash
Cornelius L. Ehret
BY
their ATTORNEY.

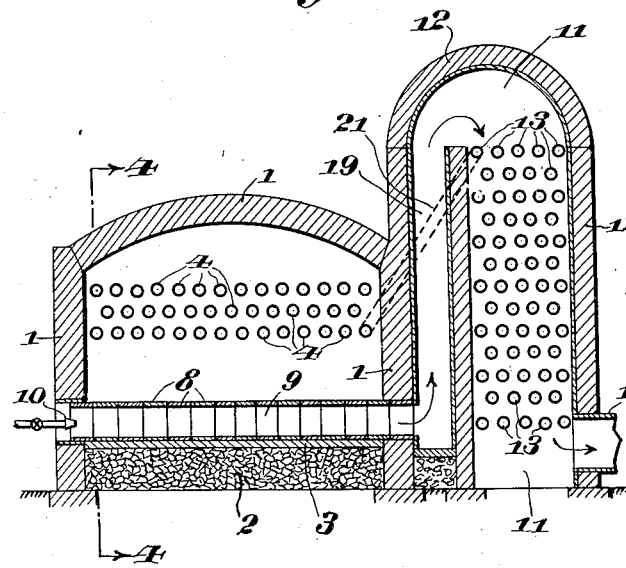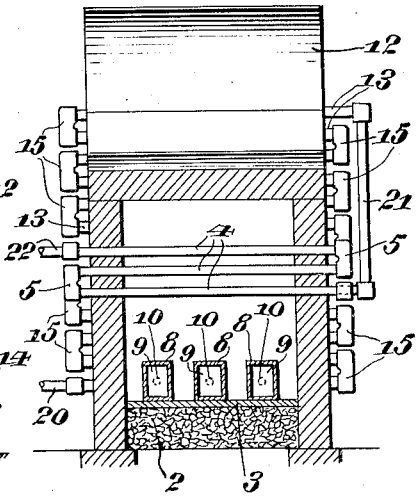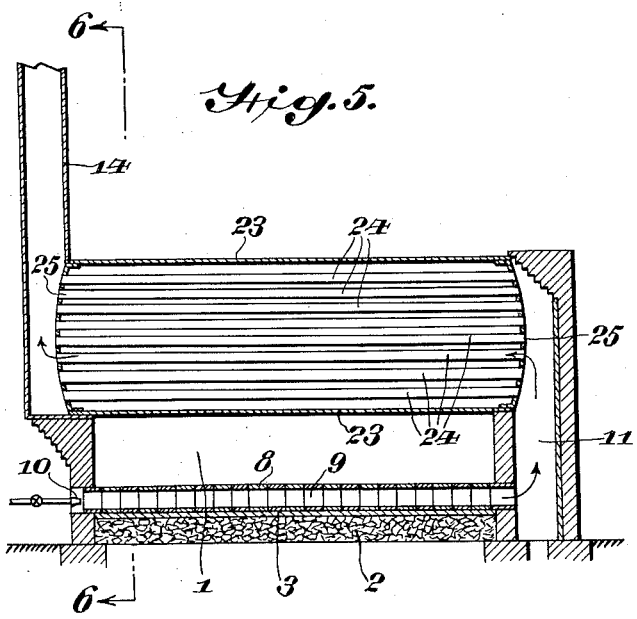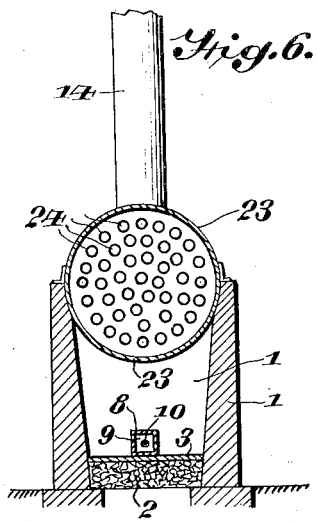

Patented July 6, 1926.

1,591,431

UNITED STATES PATENT OFFICE.

ARTHUR E. NASH, OF PHILADELPHIA, AND JAMES S. ALCORN, OF CYNWYD, PENNSYLVANIA.

HEAT-TRANSFER SYSTEM.

Application filed December 24, 1924. Serial No. 757,940.

Our invention relates to a system for effecting transfer of heat to absorption structure, as for example that of steam generators, oil stills and the like.

In accordance with our invention, heat from a suitable source or sources thereof, as a combustion chamber, or equivalent, is transferred substantially exclusively by convection and substantially exclusively by radiation, respectively, to different or separate heat absorbing structures, either for heating different materials by the different absorption structures or, and generally, for heating a material, particularly a fluid, in stages, first by one of the absorption structures and subsequently by another.

More particularly in accordance with our invention, one or more of the heat absorption structures comprises a tube or tubes through which fluid, as liquid, vapor or gas, is passed; and more particularly in accordance with our invention each of a plurality of heat absorption structures comprises a tube or tubes with application of heat by convection to one tubular absorption structure and by radiation to another absorption structure with connections for effecting passage of the fluid through the tubular structures in succession.

Further in accordance with our invention the material to be heated first passes through that absorption structure heated by convection, and subsequently through that heated by radiation.

Further in accordance with our invention oil, as petroleum or a component or product thereof, is first subjected, for any suitable heat treatment including simple distillation or destructive distillation or cracking, to heat transferred thereto by convection or radiation and subsequently to heat transferred thereto by radiation or convection.

Our invention resides in the method, system and apparatus of the character hereinafter described and claimed.

For an understanding of our method and for an illustration of some of the various forms our invention may take, reference is to be had to the accompanying drawings in which:

Fig. 3 is a vertical sectional view of a modified form of our apparatus.

Fig. 4 is a vertical sectional view, partly in elevation, on the line 4—4 of Fig. 3.

Fig. 5 is a vertical sectional view of a further form of our invention.

Fig. 6 is a vertical sectional view, partly in elevation, taken on the line 6—6 of Fig. 5.

Figure 1:
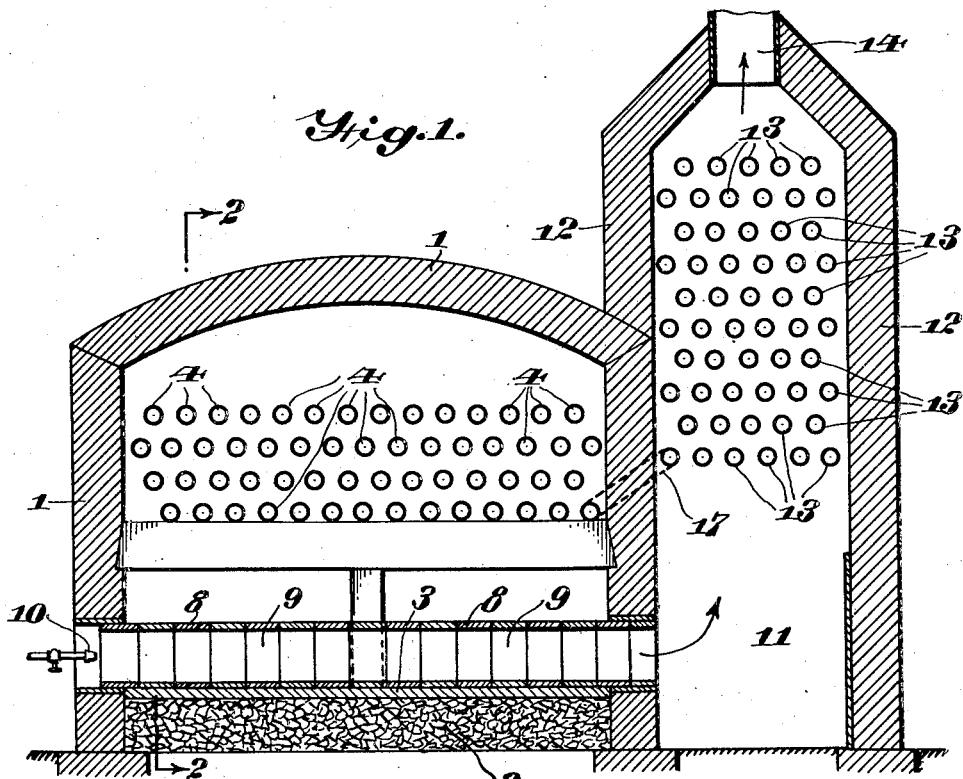
Fig. 1 is a vertical sectional view of heat transfer apparatus embodying our invention.
Figure 2:
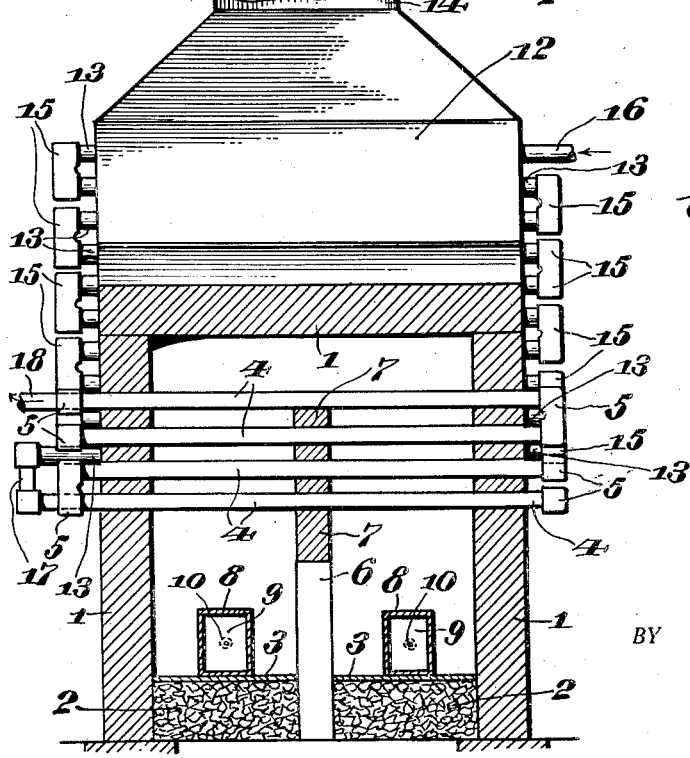
Fig. 2 is a vertical sectional view, partly in elevation, taken on the line 2—2 of Fig. 1.

Referring to Figs. 1 and 2, 1 is a heating chamber whose walls may be of brick work or equivalent and whose bottom or floor 2 comprises any suitable filling, preferably overlaid by a layer or course 3 of fire brick or equivalent.

Disposed within the heating chamber 1 are the tubes 4, of iron, steel or other suitable material, extending in any suitable direction as, for example, horizontally as indicated, or inclined when suitable or desirable. All the tubes 4 may be connected in tandem or in series with each other as by the couplings or headers 5, preferably disposed externally to the chamber 1. Or the tubes 4 may be disposed in serially arranged groups of two or more tubes in parallel with each other.

When desirable there may be provided tube supporting means such, for example, as the pier 6 upon which is disposed the tube supporting member 7 of fire brick or other suitable refractory material.

Disposed within the chamber 1 is or are one or more sources 8 of radiant heat, the relative positions of the sources of radiant heat and the tubes 4 within the chamber being anything suitable or desirable. In the example illustrated the sources 8 are disposed at or adjacent the bottom of the chamber 1 for effecting upward radiation to the tubes 4.

The source of radiant heat may be of any suitable type and of any suitable material which may be maintained at incandescence or at temperatures ranging upwardly to 3000° F. or higher.

In the example illustrated each source 8 may comprise the side and top walls of a combustion chamber 9, of the character, for example, disclosed in our application Serial No. 684,456 filed January 4, 1924. The walls of the combustion chamber may be formed in sections, as indicated in Fig. 1, by utilizing therefor plates, slabs or tile of silicon carbide, or other highly refractory material, generally in combination with a binder, and having high heat conductivity, for example, materially greater than that of firebrick, which, and materials of like low thermal conductivity (high thermal resistivity) are unsuitable for our purposes.

Within the chamber 9 may be effected combustion of any suitable material, solid or fluid. In the example illustrated, gas or oil supplied to the burner 10 is burned within the chamber 9, the combustion progressing as the fuel, air and gases progress through the chamber. Part of the heat of combustion is utilized to raise the walls to suitably high temperature to effect suitable rate of radiation of heat to the tubes 4 within the chamber 1 from which the hot gases of combustion are more or less completely excluded.

The hot gases or products of combustion pass from the chamber 9 into the bottom of the chamber 11, formed by the walls 12, then upwardly around and between the tubes 13, and thence onwardly to any suitable destination,—as for example to the stack 14.

The tubes 13 within the chamber 11 constitute a second heat absorption structure to which heat is transferred by convection; that is, by conduction from the passing hot gases.

The tubes 13 may all be connected in series with each other, as by means of couplings or headers 15, preferably located externally to the chamber 11; or the tubes 13 may be disposed in serially arranged groups of two or more tubes in parallel with each other.

The combustion of fuel may be complete or substantially complete within the chambers 9, or some of the fuel and air may reach the chamber 11 and there effect the final stage or stages of combustion.

The fluid to be heated is passed in succession through the heat absorption structures comprising respectively the tubes 4 and 13, first through either absorption structure and thereafter through the other, the sets of tubes enclosing and preventing contact of the fluid with the surrounding gaseous medium, hereinafter termed "atmosphere" in the appended claims. In the example illustrated, and particularly in those cases where the temperature of the fluid is to be raised as it progresses through the heating zones, it is first passed through the zone or absorption structure heated by convection and thereafter through that heated by radiation. For example, the fluid may enter the uppermost tube or tubes 13 at 16, progress downwardly, counter-current to the ascending hot gases, to the lowermost tube or tubes 13 and thence, by connection 17, to the lowermost tube or tubes 4, thence upwardly through the remainder of the tubes to the discharge outlet 18. Or the fluid from the tubes 13 may enter the uppermost tube or tubes 4 and be discharged from the lowermost.

In Figs. 3 and 4 the arrangement is, in general, the same except that the exit gases from the chamber 9 pass upwardly through the flue 19 to the upper portion of the chamber 11 and thence downwardly and around the tubes 13 therein, and thence outwardly by stack 14. In this instance the fluid may enter the lowermost tube or tubes 13 at 20, pass upwardly through the series of tubes or groups of tubes 13, counter-current to the descending gases, outwardly through the connection 21 to the tubes 4, as to the lowermost of them, as indicated, and then upwardly through them and outwardly to the discharge outlet 22.

In Figs. 5 and 6, there is contained in the boiler shell or still 23 the water, oil, or other material to be heated and operated upon therein either in batches, or by continuous or semi-continuous feed to and withdrawal from the shell 23. Extending longitudinally of the shell are the flues or fire tubes 24, extending through the end sheets 25 of the shell, and communicating at one end with the chamber 11 and at the other end with the stack 14.

In this case again the radiant heat chamber 1 is isolated from the exit or convection gases discharged from the combustion chamber 9. The shell 23 receives directly radiant heat from the walls of the chamber 9, while the hot gases pass through the tubes or flues 24, heating them by conduction or convection and so additionally transmitting heat to the material within the shell 23. In this instance the material to be heated receives heat simultaneously by radiation and convection, with isolation, however, of the points of application of the radiant and convection heats.

The rate of heat transfer by radiation is proportional to the fourth power of the difference between the absolute temperatures of the radiating and absorbing structures, whereas the rate of heat transfer by convection is proportional to the first power of the difference between the absolute temperatures of the hot gases and the heat absorbing structure. Accordingly, where heat transfer is effected simultaneously by radiation and convection, the temperature of the heat absorbing structure may become excessive.

By the method and structure herein described, the radiant and convection heats are applied in zones or regions distinct or separate from each other as distinguished from those cases where a surface of heat absorption structure is subjected simultaneously to radiant and convection heats, and in which cases, particularly where the fluid, as oil, must be raised to high temperature, the wall of the heat absorption structure and/or the material heated may attain excessive temperature resulting in its destruction, deformation or other unsuitability for continued service.

Where heat absorption structure has been subjected simultaneously to heat transfer by both radiation and convection, it has sometimes been the practice to reduce the amount of radiant heat absorbed or to prevent as far as possible absorption of radiant heat, with resultant reduction in economy of the total heat transfer as measured in terms of fuel or the total amount of heat energy expended. In those cases it has been difficult, if not impossible, suitably or adequately to control the transfer of heat simultaneously by radiation and convection. Where radiant and convection heats have so been simultaneously applied to heat absorption structure, it has in some cases been the custom to utilize in the combustion chamber excess amounts of air thereby to diminish the temperature of the gases utilized in applying the convection heat, and thereby preventing excessive or dangerous temperature rise of the heat absorption structure; the efficiency is in consequence diminished, at least in so far as regards the heat units carried off by the excess air.

In accordance with our invention, however, the rate of absorption of heat is not excessive at any portion or region of the heat absorption structure as a whole, inasmuch as the heat transfers by radiation and convection are separately localized, effecting in the different regions or zones suitably high but not excessive rates of heat transfer to the material to be heated without danger to the walls, tubes or shell of the heat transfer structure, or to the material heated. It further follows from our invention that excessive air for combustion is not required, and that the economy or efficiency is high and there is no lack of or need for control of the relative amounts of heat transferred by convection and radiation; and there is no need for resort to means for wastefully diminishing or restricting the application of the radiant or convection heat.

In accordance with our invention the fall in temperature as between the maximum temperature of combustion and the temperature of the gases discharged to the stack is a maximum, or, otherwise stated, a maximum of heat is absorbed and the temperature of the eventually discharged gases is relatively low.

It is characteristic of our invention that there is applied by convection to a heat-absorbing structure heat from the gases of combustion, and to another heat-absorption structure there is separately applied by radiation heat derived from the gases of combustion. It is further characteristic of our invention that the heat applied to one of the heat-absorbing structures is radiated, through substantial intervening space, from the outer side of a combustion chamber whose wall is of silicon carbide or equivalent material of thermal conductivity which is high as compared with the thermal conductivity of firebrick and the like commonly utilized for insulating or protecting tubes or the like from the direct effect of the heat in a combustion chamber; it is our purpose not to diminish or prevent high rate of transfer of heat to the radiantly heated absorption structure by interposition of firebrick or other material of high thermal resistivity, but, on the contrary, invite and induce high rate of heat transfer by utilizing silicon carbide or equivalent material of high heat conductivity offering only relatively low resistance to heat transfer. Further in accordance with our invention, the rate of combustion in the furnace chamber may be high, by utilizing with the fuel an amount of air which is not excessive or which effects substantial dilution, but which is but slightly, if at all, in excess of the amount essential to complete combustion, and in our system the high temperatures due to the high rate of and efficient combustion are advantageously applied to one of the heat-absorbing structures by heat radiated from the silicon carbide or equivalent material of high heat conductivity intervening between the hot gases of combustion and the radiantly heated absorption structure, while the gases by convection separately and independently heat a second heat-absorption structure.

Petroleum, or a component or a product thereof, may be heated in accordance with our method or by our structure for effecting a desired result. For example, the oil may be first passed through the tubes 13 preheating it to a desired temperature, and thereafter passed through the tubes 4 where it may be subjected to the same or different temperature, generally a high temperature, by the radiant heat absorbed. For example, oil may be subjected to conditions effecting dissociation or cracking in the tubes 13 or tubes 4, or in both, under any suitable pressure, as super-atmospheric pressure, as well understood in the oil cracking art. Petroleum may also be suitably treated, distilled or cracked in the structure indicated in Figs. 5 and 6.

In the art of cracking petroleum our method and apparatus are of particular advantage and importance, in that, for a given amount of heat generated by combustion, the division into radiant and convection components as herein described effects a more even distribution of heat, without local overheating in either the convection or radiant heat chambers, thus allowing an increase in total heat input without localized temperatures of a magnitude destructive of the tubes or walls of the heat absorbing structures. This effective distribution of the total heat makes possible continuous runs of materially greater length, and with such carbon as is deposited upon the inner surfaces of the heat absorbing walls the rate of heat transfer and the temperatures attained are not such as to effect local overheating, deformation or destruction of those walls; the distribution of the heat makes possible, further, high efficiency of combustion, with substantially no excess air and with low temperature of the exit gases, with consequent economy of fuel; and the distribution is such that the heat transferred per unit of area of the heat absorption structure is not excessive anywhere in any of the heat absorption structures.

By way of example, merely, it may be stated that in a system for cracking petroleum by a so-called tube and tank method, utilizing our herein-described method and apparatus, petroleum was treated continuously for a period of eighty-three days, by passage through the heating system of 120,000 barrels of fresh stock, or a throughput of approximately double that amount, yielding over 44,000 barrels of 410 degree end point gasoline. Upon inspection of the apparatus it was found that there had been no occasion for discontinuing the run, for the tubular heat absorption structure was in perfect condition and such small amount of coke as had been deposited within the tubes was evenly distributed throughout and had not interfered in any way with the operation of the apparatus. The amount of carbon or coke deposited was less than one-quarter of one per cent on the through-put; the gas produced was approximately 1.7 per cent and the total loss including coke, gas and other losses was less than 2½ per cent on through-put. The fuel consumption was 3.45 per cent on fresh stock charged, 1.7 on through-put, or 8.8 per cent based upon the end point gasoline produced.

By way of further example, it may be stated that the treatment of caustic treated lubricating stock in a still of the character shown in Figs. 5 and 6 is materially improved over prior practice of which it is characteristic that the runs have averaged from seven to ten days after which, because of the accumulation of solids in the form of hard scale, the wall of the shell wall became overheated, requiring shut down for cleaning off the accumulated scale. By our method and apparatus, however, treatment of similar caustic treated lubricating stock in the same still structure, converted, however, to accord with our system, may be continued in runs increased to a length of forty-two days, and the accumulated solids are in the form of soft fluffy material readily removed.

Again in crude oil topping stills the duration of runs is increased to the order of nine times before need for cleaning.

The transfer of radiant heat is in a sense selective in that it is more readily absorbed at or by black and, therefore, cooler areas. For example, with an accumulation of solids upon the inner wall of a tube or still bottom, the tendency to overheat at that region is avoided when the source of heat is substantially entirely radiant, due to the greater selective absorption of the radiant heat by the adjoining areas which are relatively cooler.

It shall be understood that our method and apparatus are applicable for various purposes, and that our invention is not limited to transfer of heat to any particular material or materials for any particular purpose or purposes.

Apparatus of the character indicated in Figs. 1 to 4 inclusive may be utilized, for example, for super-heating steam which may be generated in a boiler and then passed in succession through the tubes 13 and 4, or vice versa; or the steam may be generated in the tubes 13 or 4, and super-heated in the tubes 4 or 13.

What we claim is:

1. The method of raising the temperature of a fluid in stages, which comprises generating heat, dividing the heat generated into radiant and connection components, passing the fluid in succession through said stages while enclosing and preventing contact thereof with the surrounding atmosphere, and applying said heat components independently of each other to said material in the different stages.

2. The method of transferring heat, which comprises generating heat, dividing the heat generated into radiant and convection components, applying said components separately to different heat-absorption structures, and passing material to be heated into heat exchanging relation with said absorption structures in succession, said structures enclosing and preventing contact of the material with the surrounding atmosphere.

3. The method of transferring heat to a material, which comprises generating heat by combustion, applying heat substantially solely by radiation and by convection, respectively, separately to different heat absorption structures, and subjecting the material to heat absorption in said absorption structures in succession, said structures enclosing and preventing contact of the material with the surrounding atmosphere.

4. The method of transferring heat to a material, which comprises generating heat by combustion, applying heat substantially solely by radiation and by convection, respectively, separately to different heat absorption structures, and subjecting the material in one of the structures to heat delivered thereto by convection and thereafter in another of said structures to heat delivered thereto by radiation, said structures enclosing and preventing contact of the material with the surrounding atmosphere.

5. The method of applying heat to fluid in stages, which comprises continuously passing the fluid in succession through heat absorption structures, and heating said structures substantially solely by radiation and convection, respectively, said structures enclosing and preventing contact of the fluid with the surrounding atmosphere.

6. The method of applying heat to fluid in stages, which comprises continuously passing the fluid in succession through heat absorption structures, and applying heat by convection to the absorption structure first traversed by said fluid, and separately applying heat substantially solely by radiation to the absorption structure later traversed by said fluid, said structures enclosing and preventing contact of the fluid with the surrounding atmosphere.

7. The method of treating petroleum, which comprises passing it in succession through different heat absorption structures, generating heat, dividing the heat generated into radiant and convection components, applying the radiant component to one of said structures, and separately applying the convection component to another of said structures.

8. The method of treating petroleum which comprises passing it in succession through different heat absorption structures to raise it to cracking temperature, generating heat, dividing the heat generated into radiant and convection components, applying the radiant component to one of said structures, and separately applying the convection component to another of said structures.

9. The method of treating petroleum which comprises passing it under superatmospheric pressure in succession through different heat absorption structures to raise it to cracking temperature, generating heat, dividing the heat generated into radiant and convection components, applying the radiant component to one of said structures, and separately applying the convection component to another of said structures.

10. Heat transfer apparatus comprising serially connected heat absorption structures in which material to be heated is enclosed and prevented from contact with the surrounding atmosphere, a source of heat, means for dividing the heat therefrom into radiant and convection components, and means for applying said components separately to said heat absorption structures.

11. Heat transfer apparatus comprising serially connected metallic heat absorption structures in which material to be heated is enclosed and prevented from contact with the surrounding atmosphere, a source of heat, means for dividing the heat therefrom into radiant and convection components, means for applying said components separately to said heat absorption structures, and means for passing the material to be heated in succession through the structures heated, respectively, by said components.

12. Heat transfer apparatus comprising separate serially connected metallic heat absorbing structures in which fluid to be heated is enclosed and prevented from contact with the surrounding atmosphere, a source of heat, means for delivering to one of said structures substantially only radiant heat derived from said source, and means for separately applying heat from said source by convection to another of said absorption structures.

13. Heat transfer apparatus comprising separate serially connected heat absorbing structures in which fluid to be heated is enclosed and prevented from contact with the surrounding atmosphere, a source of heat, means for delivering to one of said structures substantially only radiant heat derived from said source, means for separately applying heat from said source by convection to another of said absorption structures, and means for passing the fluid to be heated in succession through the heat absorption structures.

14. Heat transfer apparatus comprising separate serially connected heat absorbing structures, a source of heat, means for delivering to one of said structures radiant heat derived from said source, means for separately applying heat from said source by convection to another of said absorption structures, and means for passing fluid under pressure through one of said absorption structures heated by convection and thereafter through another of said absorption structures heated by radiation.

15. In the art of cracking petroleum, the method of transferring heat thereto which comprises passing the petroleum in succession through different heat absorption structures, generating heat, dividing therefrom a radiant heat component, applying heat substantially exclusively by said radiant heat component to one of said heat absorption structures, and applying by convection a part of the generated heat to another of said heat absorption structures.

16. Heat transfer apparatus comprising separate heating chambers, banks of heat absorption tubes disposed respectively in said chambers, a combustion chamber having heat radiating walls disposed in one of said heating chambers, a connection between said combustion chamber and another of said heating chambers for passing therethrough hot gases from said combustion chamber, and means for passing fluid material to be heated in succession through said heat absorption tubes.

17. Heat transfer apparatus comprising separate heating chambers, banks of heat absorption tubes disposed respectively in said chambers, a combustion chamber having heat radiating walls disposed in one of said heating chambers, a connection between said combustion chamber and another of said heating chambers for passing therethrough hot gases from said combustion chamber, and means for passing fluid through the heat absorption structure in said other of said heating chambers, counter-current to the gases therein, and thereafter through the heat absorption structure in said one of said heating chambers.

18. Petroleum treating apparatus comprising a plurality of separate heating chambers, serially-connected heat absorption structures disposed respectively in said heating chambers, a source of heat, means for applying substantially only radiant heat derived from said source to the absorption structure in one of said heating chambers, and means for separately applying by convection to the absorption structure in another of said heating chambers heat derived from said source.

19. Tubular pressure still structure for cracking petroleum comprising a plurality of separate heating chambers, tubular heat absorption structures disposed respectively in said heating chambers, means for heating one of said absorption structures by convection, and means for heating another of said absorption structures substantially exclusively by radiation.

20. Tubular pressure still structure for cracking petroleum comprising a plurality of separate heating chambers, tubular heat absorption structures disposed respectively in said heating chambers, a connection between said absorption structures for passage of the petroleum therethrough in succession, a combustion chamber having heat radiating walls disposed in one of said heating chambers, and a connection from said combustion chamber to another of said heating chambers for imparting heat by convection to the absorption structure therein, and means for introducing the oil into the absorption structure heated by convection.

21. Heat transfer apparatus comprising a combustion chamber, heat-absorption structure receiving heat from a wall of said chamber substantially solely by radiation, heat-absorption structure receiving heat from said chamber by convection, and means for passing material through said structures in succession, whereby the material is enclosed and prevented from contact with the surrounding atmosphere.

22. The method of transferring heat, which comprises generating heat by burning fuel with air, limiting the amount of air to effect substantially complete combustion and to maintain substantially maximum temperature, dividing the resulting heat into radiant and convection components, applying the radiant heat substantially to the exclusion of convection heat to heat absorption structure in which material to be heated is enclosed and prevented from contact with the surrounding atmosphere, and applying the convection heat to another heat absorption structure.

23. The method of transferring heat, which comprises generating heat by burning fuel with air, limiting the amount of air to effect substantially complete combustion and to maintain substantially maximum temperature, dividing the resulting heat into radiant and convection components, applying the radiant heat substantially to the exclusion of convection heat to heat absorption structure in which material to be heated is enclosed and prevented from contact with the surrounding atmosphere, applying the convection heat to another heat absorption structure and passing the material in succession through said heat absorption structures.

24. The method of transferring heat, which comprises effecting combustion in a chamber having a wall of high heat conductivity, applying heat to heat absorption structure in which material to be heated is enclosed and prevented from contact with the surrounding atmosphere from said wall substantially exclusively by radiation, and applying heat to another heat absorption structure by convection.

25. The method of transferring heat, which comprises effecting combustion in a chamber having a wall of high heat conductivity, applying heat from said wall substantially exclusively by radiation directly to heat absorption structure spaced therefrom and applying heat to another heat absorption structure by convection, said heat absorption structures enclosing and preventing contact of material to be heated with the surrounding atmosphere.

26. The method of transferring heat, which comprises generating heat by burning fuel with air in a chamber having a wall of high heat conductivity, limiting the amount of air to effect substantially complete combustion and to maintain substantially maximum temperature, applying a part of the heat to heat absorption structure from said wall substantially exclusively by radiation, and applying another part of the heat to other heat absorption structure by convection, said heat absorption structures enclosing and preventing contact of material to be heated with the surrounding atmosphere.

27. In the art of producing lower boiling points hydrocarbons from higher boiling point hydrocarbons, the method of heating the hydrocarbons, which comprises passing them in succession through different heat absorption structures, generating heat, dividing the heat generated into radiant and convection components, applying the radiant component to one of said structures, and separately applying the convection component to another of said structures.

28. In the art of producing lower boiling point hydrocarbons from higher boiling point hydrocarbons, the method of heating the hydrocarbons, which comprises passing them under super-atmospheric pressure in succession through different heat absorption structures, generating heat, dividing the heat generated into radiant and convection components, applying the radiant component to one of said structures and separately applying the convection component to another of said structures.

29. The method of transferring heat to a material, which comprises generating heat by combustion, applying said heat by convection and substantially exclusively by radiation, respectively, separately to different heat absorption structures, and subjecting the material to heat absorption in said absorption structures in succession, said structures enclosing and preventing contact of the material with the surrounding atmosphere.

30. The method of transferring heat to a material, which comprises generating heat by combustion, applying heat by convection and substantially exclusively by radiation, respectively, separately to different heat absorption structures, and subjecting the material in one of the structures to heat delivered thereto by convection and thereafter in another of said structures to heat delivered thereto by radiation, said structures enclosing and preventing contact of the material with the surrounding atmosphere.

31. Heat transfer apparatus comprising heat absorption structures, means for passing material in succession through said structures, and a source of radiant heat spaced from one of said structures applying heat substantially exclusively by radiation to said last-mentioned structure through the intervening space, said last-mentioned structure enclosing and preventing contact of the material with the surrounding atmosphere.

32. Heat transfer apparatus comprising heat absorption structures, means for passing material in succession through said structures, a source of radiant heat spaced from one of said structures applying heat substantially exclusively by radiation to said last-mentioned structure through the intervening space, and means for applying heat by convection to another of said structures, said structures enclosing and preventing contact of the material with the surrounding atmosphere.

33. Heat transfer apparatus comprising a combustion chamber having a wall of high heat conductivity, heat absorption structure receiving heat from said wall substantially solely by radiation, other heat absorption structure receiving heat from said chamber by convection, and means for passing fluid material through said structures in succession, said structures enclosing and preventing contact of the fluid material with the surrounding atmosphere.

34. Heat transfer apparatus comprising a combustion chamber having a wall comprising silicon carbide, heat absorption structure receiving heat from said wall substantially solely by radiation, other heat absorption structure receiving heat from said chamber by convection, and means for passing fluid material through said structures in succession, said structures enclosing and preventing contact of the fluid material with the surrounding atmosphere.

35. Fluid heating apparatus, comprising a radiation combustion chamber, means for effecting combustion within said chamber, a second chamber substantially closed and isolated from said combustion chamber receiving heat therefrom substantially exclusively by radiation, heat absorption structure in said second chamber, a third chamber connected with said combustion chamber, and other heat absorption structure in said third chamber exposed to the hot gases passing from said combustion chamber, and means for passing the fluid to be heated in succession through said heat absorption structures.

36. In the art of cracking petroleum, the method of transferring heat thereto which comprises passing the petroleum in succession through different heat absorption structures, generating heat, dividing therefrom a component that is substantially exclusively radiant heat, applying by convection a part of the heat generated to the heat absorption structure first traversed by the petroleum, and applying heat substantially exclusively by said radiant heat component to the heat absorption structure thereafter traversed by the petroleum.

37. In the art of cracking petroleum, the method of transferring heat thereto which comprises generating heat, applying a part of said heat substantially exclusively by radiation to a heat absorption structure, applying another part of said heat to another heat absorption structure by convection, and passing the petroleum in succession through said heat absorption structures.

In testimony whereof we have hereunto affixed our signatures this 20th day of December, 1924.

ARTHUR E. NASH.
JAMES S. ALCORN.

Certificate of Correction.

It is hereby certified that in Letters Patent No. 1,591,431, granted July 6, 1926, upon the application of Arthur E. Nash, of Philadelphia, and James S. Alcorn, of Cynwyd, Pennsylvania, for an improvement in "Heat-Transfer Systems," errors appear in the printed specification requiring correction as follows: Page 4, line 114, claim 1, for the word "connection" read *convection;* page 6, lines 31 and 34, for the word "structure" read *tubes;* and that the said Letters Patent should be read with these corrections therein that the same may conform to the record of the case in the Patent Office.

Signed and sealed this 5th day of October, A. D. 1926.

[SEAL.]
M. J. MOORE,
*Acting Commissioner of Patents.*